US012451305B2

(12) United States Patent
Feng et al.

(10) Patent No.: US 12,451,305 B2
(45) Date of Patent: Oct. 21, 2025

(54) BUTTON STRUCTURE

(71) Applicant: Peratech IP Ltd., North Yorkshire (GB)

(72) Inventors: Xu Feng, Jiansu (CN); Sun Kun, Jiansu (CN); Wang Shichao, Jiansu (CN); Wei Xin, Jiansu (CN)

(73) Assignee: Peratech IP Ltd, North Yorkshire (GB)

( * ) Notice: Subject to any disclaimer, the term of this patent is extended or adjusted under 35 U.S.C. 154(b) by 290 days.

(21) Appl. No.: 17/919,315

(22) PCT Filed: Jun. 11, 2021

(86) PCT No.: PCT/GB2021/000070
§ 371 (c)(1),
(2) Date: Oct. 17, 2022

(87) PCT Pub. No.: WO2021/209737
PCT Pub. Date: Oct. 21, 2021

(65) Prior Publication Data

US 2023/0170164 A1 Jun. 1, 2023

(30) Foreign Application Priority Data

Apr. 15, 2020 (CN) ......................... 202010292803.4
Apr. 15, 2020 (CN) ......................... 202020553588.4

(51) Int. Cl.
*H01H 13/14* (2006.01)
*H01C 10/10* (2006.01)

(52) U.S. Cl.
CPC ............ *H01H 13/14* (2013.01); *H01C 10/10* (2013.01)

(58) Field of Classification Search
CPC .......... H01H 2003/12; H01H 2013/00; H01H 2013/025; H01H 2013/52; H01H 2221/00;
(Continued)

(56) References Cited

U.S. PATENT DOCUMENTS 4,301,337 A 11/1981 Eventoff
2005/0030281 A1 2/2005 Inamura et al.
(Continued)

OTHER PUBLICATIONS

International Search Report cited in PCT/GB2021/000070, dated Sep. 14, 2021, 3 pages.
(Continued)

*Primary Examiner* — Anthony R Jimenez
(74) *Attorney, Agent, or Firm* — Cooper Legal Group LLC

(57) ABSTRACT

A button structure comprises a base layer, a supporting structure arranged on the base layer, an elastic film layer, the elastic film layer covering the support structure and connected to the support structure, the support structure and the elastic film layer defining a cavity above the base layer, a first upper electrode arranged on the lower surface of the elastic film layer and located in the cavity, a first lower electrode, arranged on the base layer and located in the cavity, and a first variable resistance elastic body between the first upper and first lower electrodes, either arranged on the lower surface of the first upper electrode or arranged on the upper surface of the first lower electrode. When the elastic film layer is elastically deformed in the direction of the base layer, the first variable resistance elastic body connects the first upper electrode with the first lower electrode so as to generate a first signal related to the elastic deformation of the first variable resistance elastic body.

10 Claims, 11 Drawing Sheets

(58) Field of Classification Search
CPC ....... H01H 2221/002; H01H 2239/006; H01H 3/12; H01H 13/00; H01H 13/14; H01H 13/50; H01H 13/70; H01H 13/7006; H01H 13/702; H01C 10/10; H01C 10/106; H01C 10/12; H01C 10/14; H01C 10/38; H01C 10/50
USPC ........................................................ 200/341
See application file for complete search history.

(56) References Cited

U.S. PATENT DOCUMENTS

| | | | | |
|---|---|---|---|---|
| 2007/0056385 | A1* | 3/2007 | Lorenz | H01H 13/702<br>73/818 |
| 2009/0079613 | A1 | 3/2009 | Yamagiwa | |

OTHER PUBLICATIONS

Written Opinion cited in PCT/GB2021/000069, dated Sep. 14, 2021, 9 pages.

* cited by examiner

BUTTON STRUCTURE

CROSS REFERENCE TO RELATED APPLICATIONS

This application claims priority from Chinese Utility Model number 2020 20553588.4, filed on 15 Apr. 2020 and Chinese Patent Application number 2020 10292803.4 filed on 15 Apr. 2020. The whole content of Chinese Utility Model number 2020 20553588.4 and Chinese Patent Application number 2020 10292803.4 is incorporated herein by reference.

BACKGROUND OF THE INVENTION

The present invention relates to a button structure, an apparatus including a button structure, and a method of generating a key press signal.

Buttons of existing game keyboards generally trigger signals in the form of film resistance, relay or capacitive mechanisms, and usually only have two states of open and closed. This presents a problem in that a system having only open and closed states are undesirable in gaming applications as they do not reflect the different degrees of operation in the game.

In addition, existing keyboards which are not intended for gaming applications are designed independently from gaming keyboards. Consequently, users need to purchase two separate keyboards to accommodate the differences in ordinary use and gaming use. This increases cost and it is cumbersome to store and replace keyboards for the different uses.

BRIEF SUMMARY OF THE INVENTION

According to a first aspect of the present invention, there is provided a button structure, comprising: a base layer; a supporting structure arranged on the base layer; an elastic film layer, the elastic film layer covering the support structure and connected to the support structure, the support structure and the elastic film layer defining a cavity above the base layer; a first upper electrode arranged on the lower surface of the elastic film layer and located in the cavity; a first lower electrode and a second lower electrode, both arranged on the base layer opposite said first upper electrode and located in the cavity, each said first lower electrode and said second lower electrode are both connected to a key signal generation circuit; and a first variable resistance elastic body between the first upper and first lower electrodes, either arranged on the lower surface of the first upper electrode or arranged on the upper surface of the first lower electrode; such that when the elastic film layer is elastically deformed in the direction of the base layer, the first variable resistance elastic body connects the first upper electrode with the first lower electrode so as to generate a first signal related to the elastic deformation of the first variable resistance elastic body, and the first upper electrode electrically contacts the second lower electrode to generate a second signal.

In such a button structure, when the elastic film layer is depressed, the upper electrode will move downwards with the elastic film layer, and then compress the variable resistance elastic body. The variable resistance elastic body will change from an insulator to a conductive body when pressed. Thus, the upper electrode and the first lower electrode are connected, and the resistance value is related to the pressure, or the deformation of the variable resistance elastic body. Under the premise of realizing the two states of button opening and closing, different degrees of operation in the game can be reflected from the game keyboard buttons. The force change process realizes the continuous change and adjustment of the pressure of the game buttons, thereby improving the user's control of the degree of pressing during the game, and improving the game experience.

The opening and closing function of the ordinary keyboard can be realized by the upper electrode and one of the lower electrodes, and the aforementioned game play can be realized by the upper electrode, the variable resistance elastic body and the other lower electrode. This pressure change adjustment function can therefore integrate an ordinary keyboard and a game keyboard, thereby solving the situation that ordinary keyboards and gaming keyboards are separately designed. This allows a user to have a single keyboard, rather than having to purchase and store two keyboards.

When the upper electrode comprises two upper electrodes, the variable resistance elastic body may be on an upper or lower electrode. Optionally, one of the pairs of electrodes that does not include the variable resistance elastic body may have a greater thickness.

Optionally, one lower electrode may be arranged around another lower electrode.

Optionally, there may be two or more lower electrodes, both having a variable resistance elastic body, all covered by a further lower electrode.

Optionally, there may be a second elastic film layer between the base layer and the support structure, and the lower electrode is disposed on the second elastic film layer.

Optionally there may be a pressing mechanism comprising a pressing portion arranged above the elastic film layer and the cavity. Optionally, this may further comprise an elastic abutting portion and a least one elastic supporting portion.

According to a second aspect of the invention, there is provided an apparatus comprising at least one button structure, and a processor connected to each upper electrode and lower electrode of the button structure, wherein the processor is configured to generate the first key signal related to the amount of elastic deformation of the first variable resistance elastic body when the first upper electrode is connected to the first lower electrode through the first variable resistance elastic body. Optionally, the processor may form part of a key signal generation circuit.

According to a third aspect of the invention, there is provided a method of generating a key press signal, comprising the steps of: obtaining a button structure comprising a base layer having a first lower electrode on its upper surface, an elastic film layer having an upper electrode on its lower surface opposite both lower electrodes, and a variable resistance elastic body disposed on one of the electrodes; applying a force to the elastic film layer to move the upper electrode towards the lower electrode; compressing the variable resistance elastic body in response to the force; contacting the upper electrode and the lower electrode to generate a first signal in response to elastic deformation of the variable resistance elastic body; and contacting the upper electrode and the second lower electrode to generate a second signal.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
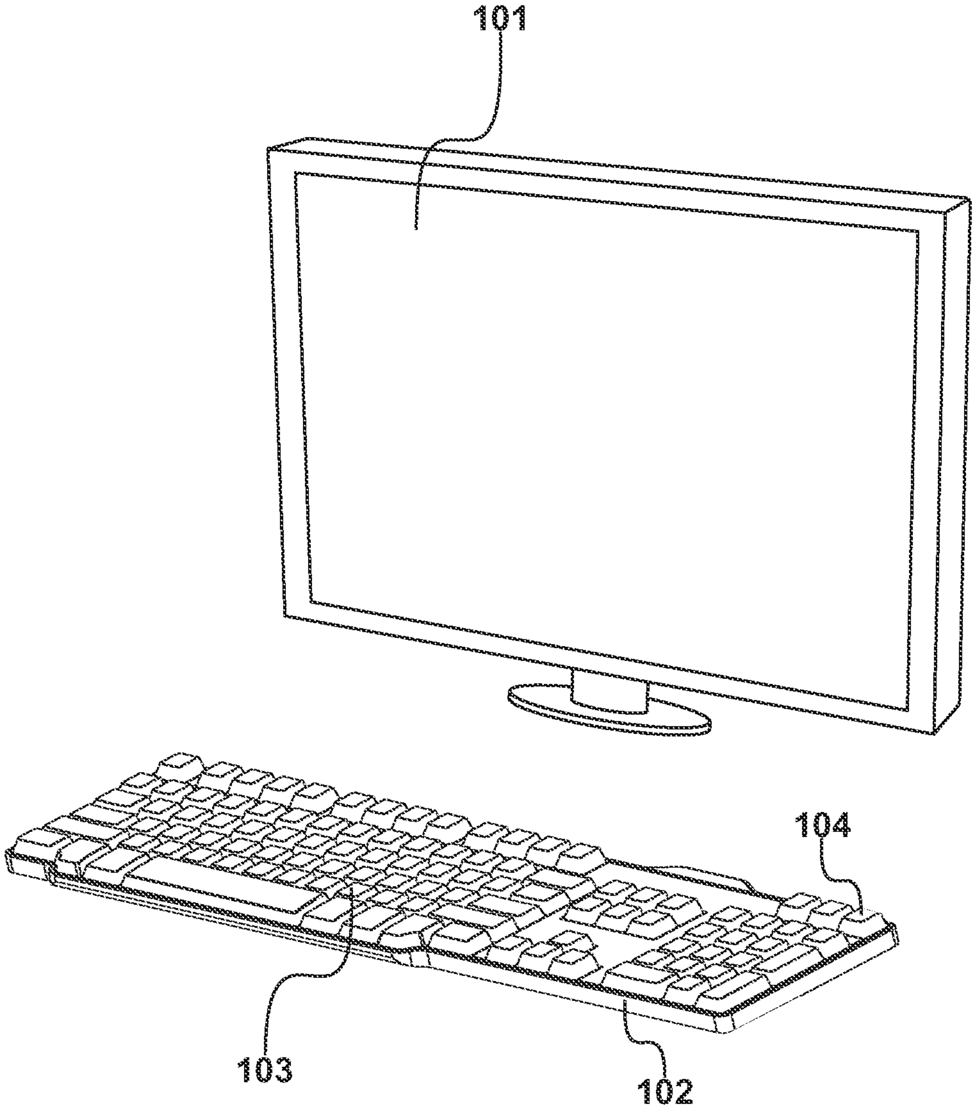
FIG. 1 illustrates a computer and keyboard in which the invention may be deployed.

FIG. 1 illustrates an environment in which the invention described herein may be deployed. A computer 101 is wirelessly connected to a keyboard 102. Manual input is provided to computer 101 by operation of keys indicated generally at 103, including key 104, on keyboard 102.

Many different designs of keyboard are available, which may connect wirelessly or using a wire. Alternatively, a keyboard may be integral to a computer, such as a laptop computer. The invention described herein may be used for any type of keyboard. It may also be used for any other type of input device that requires depression of a button.

FIG. 2

Figure 2:
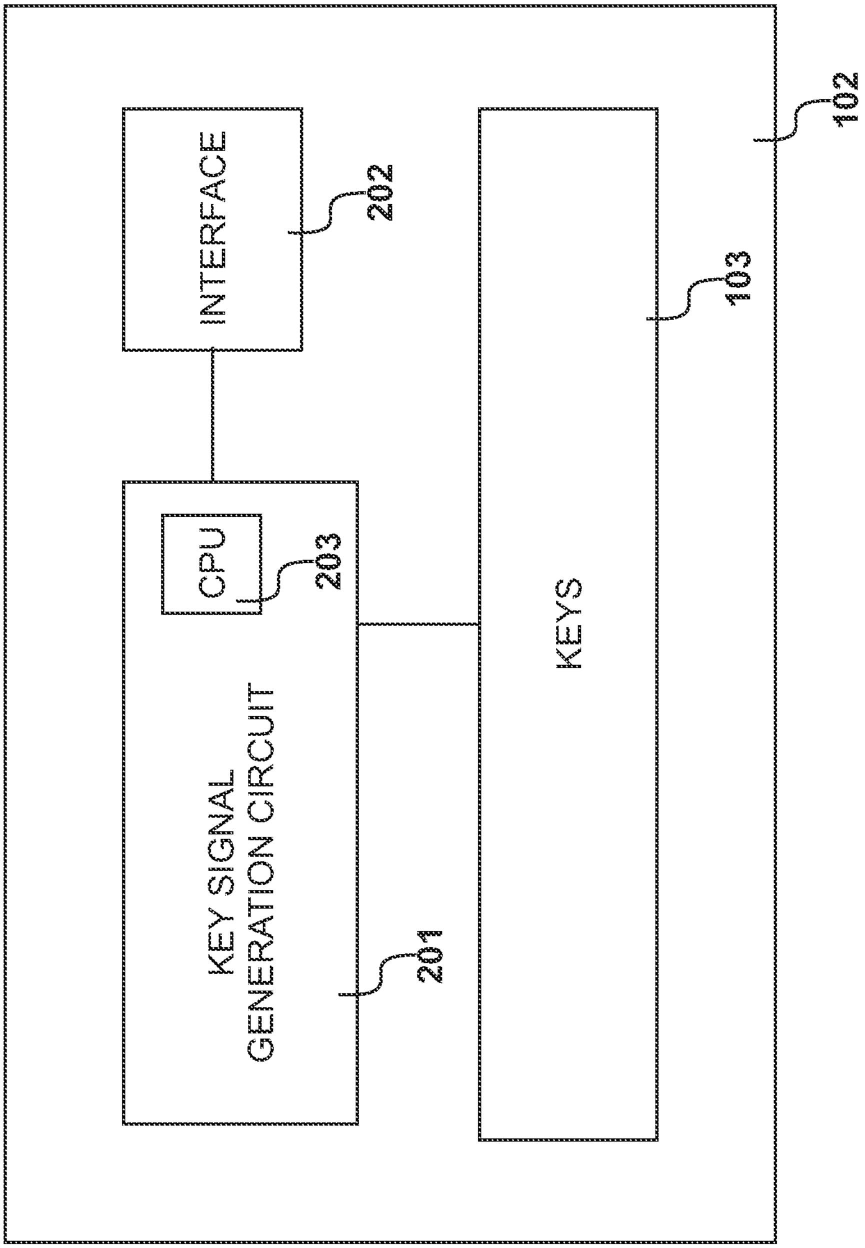
FIG. 2 is a diagram of the keyboard shown in FIG. 1.

A simplified block diagram of keyboard 102 is shown in FIG. 2. Keyboard 102 includes a number of keys 103. A key signal generation circuit 201 connects to keys 103 and also to an interface 202, which in this example is a wireless interface.

Circuit 201 receives electrical signals from keys 103 and generates key signals for provision to computer 101 via interface 202. Any circuit or alternative electronics that provides this functionality could be used. In this example, circuit 201 includes a processor, provided by CPU 203, and a number of further components not shown here.

FIG. 3

Figure 3:
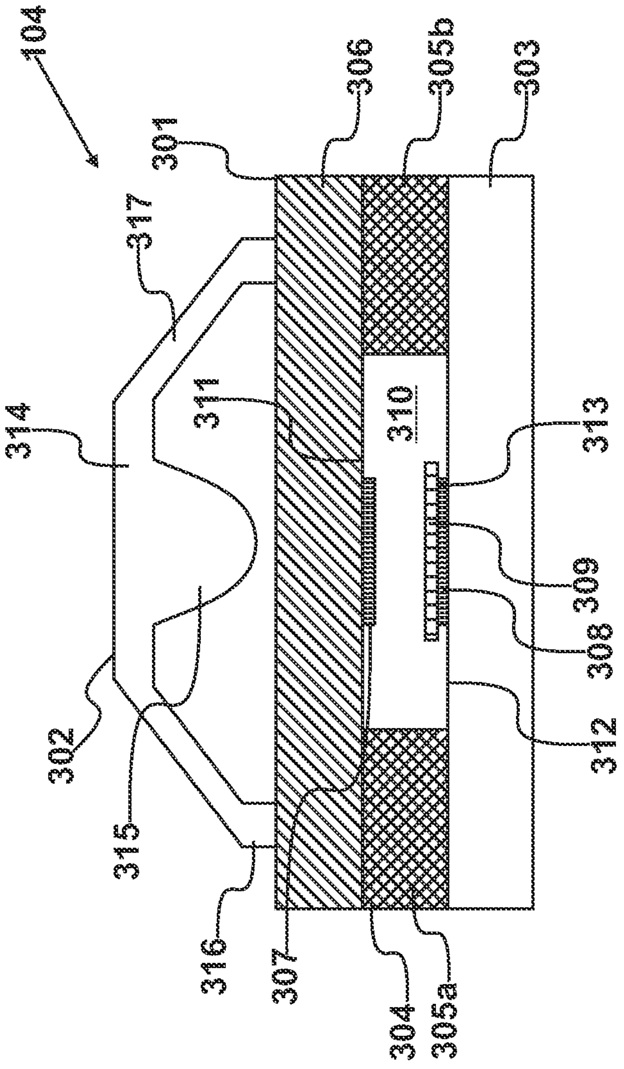
FIG. 3 is a cross section of a key shown in FIG. 1, in an embodiment beyond the scope of the present invention.

FIG. 3 is a cross section of key 104. Other keys 103 are similar, though may be of a different size and shape. Key 104 is an embodiment of a button structure according to the invention herein described, comprising a layered structure 301 and a pressing mechanism 302.

Layered structure 301 includes a base layer 303, a support structure 304 provided by two supports 305*a* and 305*b*, an elastic film layer 306, an upper electrode 307, a lower electrode 308, and a variable resistance elastic body 309. The two supports 305*a* and 305*b* are arranged on the base layer 303 at intervals, and elastic film layer 306 covers and is in contact with support structure 304. Thus, support structure 304 and elastic film layer 306 define a cavity 310 on base layer 303. In other embodiments, the support structure may comprise only one or more than two supports, and the supports may be arranged in any suitable way that creates a cavity on the base layer. The supports may be made of rubber or other elastic material, or may be a structure that fixedly connects the elastic film layer and the base layer. A layer of glue may be used, to support the elastic film layer at a certain distance from the base layer to form the cavity.

Elastic film layer 306 is made from polyimide or polyester resin, or another material which can be used to produce a thin elastic film. Base layer 303 is made from an insulating material.

Upper electrode 307 is arranged on the lower surface 311 of elastic film layer 306. Lower electrode 308 is arranged on the upper surface 312 of base layer 303, opposite upper electrode 307. Both are located within cavity 310. Variable resistance elastic body 309 is disposed on the upper surface 313 of lower electrode 308.

The material of variable resistance elastic body 309 is an elastomer. In this example it is a carbon-based quantum tunnelling composite such as that sold by the applicant Peratech Holdco Limited under the name QTC®, although it may be any carbon-based polymer material, for example, graphene. When variable resistance elastic body 309 is in the normal state, that is, when it is not subjected to an external pressing force, it is an insulator; when it is subjected to an external pressing force, its particle spacing and distribution change and it changes to a conductor. The resistance value of elastic body 309 is inversely related to the pressure received, that is to say, the greater the force, the smaller the resistance value.

Considering the quantum tunnelling composite material, the principle of the electrical conductivity is the phenomenon of field-induced quantum tunnelling. In the composite material, the metal particles are very tightly distributed in the matrix, but there is no contact between them. When compressed or deformed, the distance between the metal particles is reduced to the point where electrons can be transferred between the metal particles, thus having conductivity.

Pressing mechanism 302 includes an elastic pressing portion 314, an elastic abutting portion 315, and two elastic supporting portions 316 and 317. The upper ends of the elastic support portions 36 and 317 are connected to the lower surface of elastic pressing portion 314 at intervals, and the lower ends are respectively disposed on elastic film layer 306 and are respectively opposed to the two supports 305*a* and 305*b*. Elastic abutting portion 315 is disposed on the lower surface of elastic pressing portion 314 and located between the two elastic supporting portions 316 and 317, and elastic abutting portion 315 is thus above elastic film layer 306 and directly above cavity 310. The length of elastic supporting portions 316 and 317 and the height of elastic abutting portion 315 can be set according to actual conditions. In this embodiment, the lower surface of the elastic abutting portion 315 is a rounded curved surface, and the material of the elastic pressing portion 314, the elastic abutting portion 315 and the two elastic supporting portions 316 and 317 are rubber, but other materials may be used.

In other embodiments, the pressing mechanism could be of a different form that can apply a force to the elastic film layer, or may even be absent. For example, the elastic support portion may be a resilient structure with a spring, which drives the abutting portion to move down after the pressing portion is pressed, and rebounds and recovers after the pressure is removed; the structure of the elastic abutting portion may not be a smooth curved surface, but may be a cone etc, and so on.

In order to use button 104 to produce a key signal to send to computer 101, a user presses the elastic pressing portion 314 of the pressing mechanism 302, whereupon the two elastic supporting portions 316 and 317 will be elastically deformed and contracted due to the force. Abutting portion 315 makes contact with elastic film layer 306, and then generates a force on it, so that elastic film layer 306 is deformed towards base layer 303.

When elastic film layer 306 is deformed towards base layer 303, upper electrode 307 flexes and moves towards base layer 303, and therefore towards lower electrode 308. As upper electrode 307 moves downward, the force compresses elastic body 309, whereupon elastic body 309 is transformed into a conductor and connects upper electrode 307 and lower electrode 308 to achieve the on/off switching of the button. At the same time, since the pressure is continuously changing in the above process, the resistance of the elastic body 309 will also change accordingly, and a first key signal can be generated. The first key signal is related to the elastic deformation of elastic body 309, so that different degrees of operations in the game can be reflected in the game keyboard keys.

Taking different levels of operations in the game, such as the degree of exertion in game fighting, as an example, the force with which the keys 103 are pressed is provided by keyboard 102 to computer 101. The user's degree of exertion on the keyboard can be transmitted to the game, and then reflected by the degree of exertion of the role in the game. For example, the greater the user's force on the keyboard, the greater the exertion of the game character in a game fight.

FIG. 4

Figure 4:
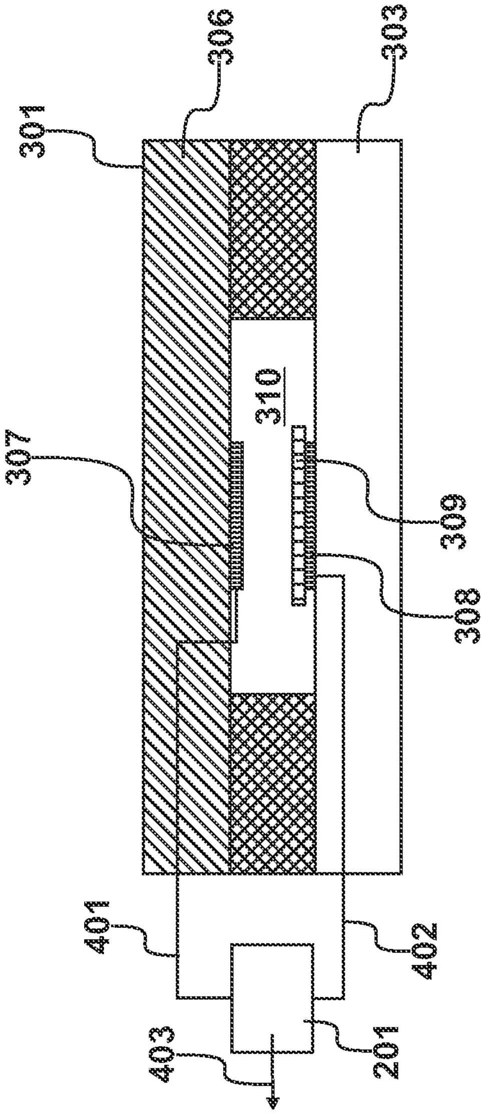
FIG. 4 is a diagram of a layered structure shown in FIG. 3.

FIG. 4 again shows layered structure 301 of button 104, without pressing mechanism 302. Connections to key signal generation circuit 201 are shown diagrammatically.

Upper electrode 307 is connected to circuit 201 by connection 401, and lower electrode 308 is connected to circuit 201 by connection 402. It will be understood that all the keys 103 are connected to circuit 201, and that this may be done using any suitable number of connections. In use, when electrodes 307 and 308 are brought into contact by pressure on elastic film layer 306, a connection is made between the electrodes which is sensed by circuit 201. Processor 203 generates a key signal 403, which is output to computer 101 via interface 202. This may be a simple on/off signal showing whether a connection has been made or not. However, for full functionality of a gaming keyboard, key signal 403 contains information derived from the amount of pressure applied to button 104. Circuit 201 measures the resistance in the connection between electrodes 107 and 108. This is related to the amount of compression or deformation of elastic body 309, and therefore the force used to depress the key.

Various alternative embodiments of the layered structure are envisaged, some of which are described with reference to FIGS. 5 to 11, all of which may be used with or without a pressing mechanism similar to mechanism 302 or any other pressing mechanism. For ease of understanding, all are shown connected to circuit 201 as part of keyboard 102.

FIG. 5

Figure 5:
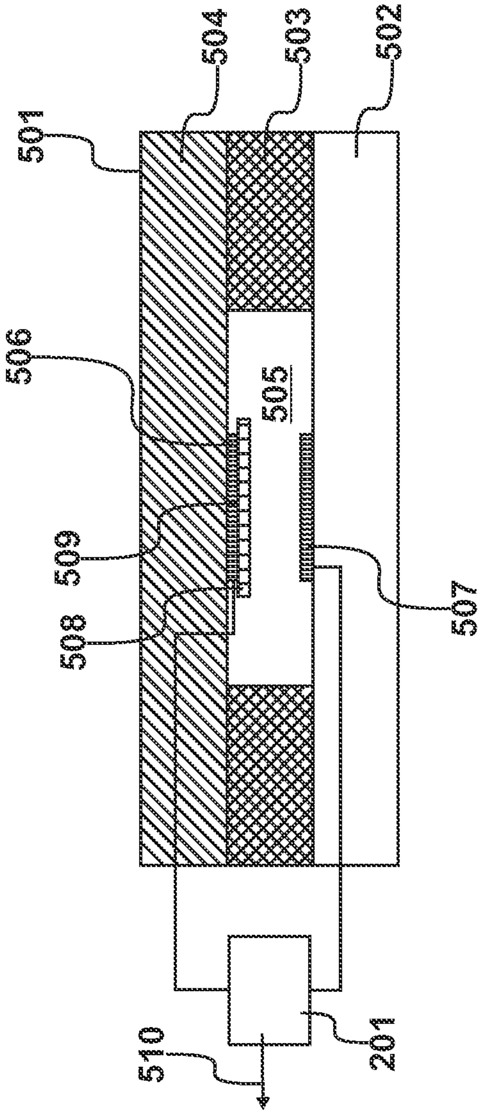
FIG. 5 is a diagram of a second embodiment beyond the scope of the invention.

A second embodiment of the invention herein described is shown in FIG. 5. Similarly to layered structure 301, layered structure 501 has a base layer 502, support structure 503, and elastic film layer 504, defining a cavity 505. Upper electrode 506 and lower electrode 507 are arranged within cavity 505, on the elastic film layer 504 and base layer 502 respectively, and both are connected to circuit 201. However, elastic body 508 is arranged on the bottom surface 509 of upper electrode 506, rather than being on lower electrode 506.

In use, layered structure 501 works in the same way to generate key signal 510 as layered structure 301.

FIG. 6

Figure 6:
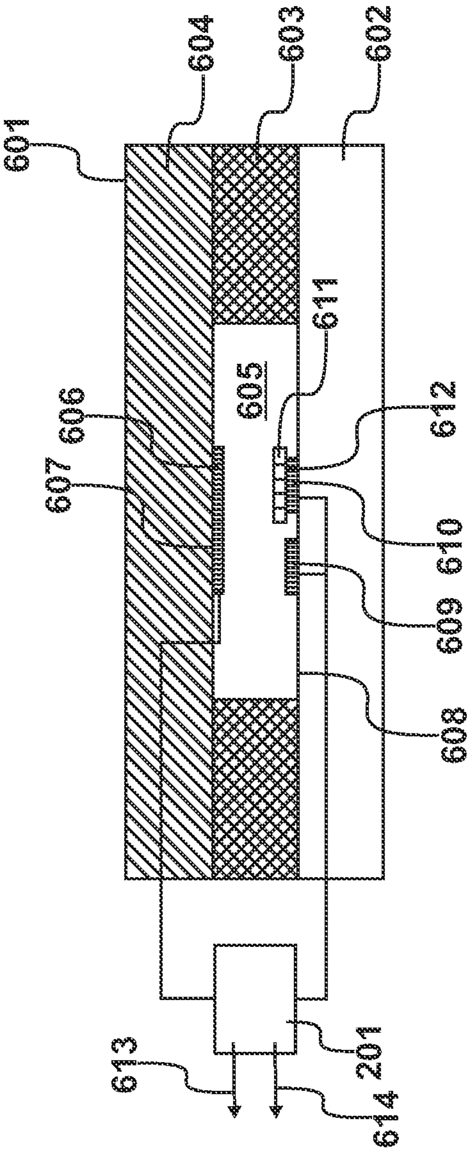
FIG. 6 is a diagram of a third embodiment in accordance with the invention.

A third embodiment is shown in FIG. 6. Similarly to layered structure 301, layered structure 601 has a base layer 602, support structure 603, and elastic film layer 604, defining a cavity 605. Upper electrode 606 is arranged on the lower surface 607 of elastic film layer 604. Arranged on the upper surface 608 of base layer 602 are first lower electrode 609 and second lower electrode 610, both opposite to upper electrode 606. All three electrodes are connected to circuit 201. Variable resistance elastic body 611 is disposed on the upper surface 612 of second lower electrode 610.

In use, force is applied to elastic film layer 604, causing it to flex and causing upper electrode 606 to move towards base layer 602. Upper electrode 606 contacts first lower electrode 609. Upper electrode 606 exerts a force on elastic body 611 arranged on second lower electrode 610, such that upper electrode 606 and second lower electrode 610 are connected. Circuit 201 generates a first key signal 613 that is related to the pressure on elastic body 611, as described with reference to FIG. 3. When first lower electrode 609 is turned on, this connection causes circuit 201 to generate a second key signal 614, which is a simple on/off signal.

In this way, the same layered structure 601 can provide an on/off key signal 614, in addition to a variable key signal 613. Therefore, the structure can integrate an ordinary keyboard and a gaming keyboard, thereby solving the situation that ordinary keyboards and gaming keyboards are separately designed. This allows a user to have a single keyboard, rather than having to purchase and store two keyboards.

Thus, key signal generating circuit 201 is electrically connected to first lower electrode 609 and second lower electrode 610, respectively. To generate a second key signal 614, upper electrode 606 is connected to first lower electrode 609 in the preset first (normal) mode; in the preset second (gaming) mode, when upper electrode 606 connects through elastic body 611 to second lower electrode 610, a first key signal 613 is generated.

When using keys having layered structure 601, keyboard 102 may include a switch to toggle between normal and game function, in which case circuit 201 will generate either key signal 613 or key signal 614.

FIG. 7

Figure 7:
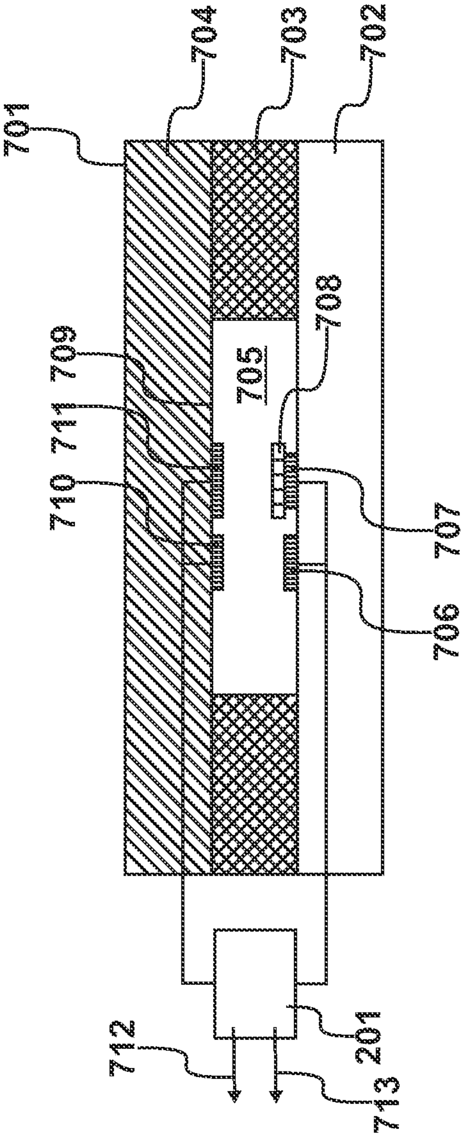
FIG. 7 is a diagram of a fourth embodiment in accordance with the invention.

A fourth embodiment is shown in FIG. 7. Similarly to layered structure 601, layered structure 701 has a base layer 702, support structure 703, and elastic film layer 704, defining a cavity 705.

First lower electrode 706 and second lower electrode 707 are arranged on base layer 702, and variable resistance elastic body 708 is disposed on second lower electrode 707. On lower surface of elastic film layer 704 are first upper electrode 710, opposite first lower electrode 706, and second upper electrode 711, opposite to second lower electrode 707. All four electrodes are connected to circuit 201.

In use, force is applied to elastic film layer 704, causing it to flex and causing upper electrodes 710 and 711 to move towards base layer 702. First upper electrode 710 contacts first lower electrode 706. This connection causes circuit 201 to generate a second key signal 713, which is a simple on/off signal. At the same time, second upper electrode 711 exerts a force on elastic body 708 arranged on second lower electrode 707, such that second upper electrode 711 and second lower electrode 707 are connected. Circuit 201 generates a first key signal 712 that is related to the pressure on elastic body 708, as described with reference to FIG. 3.

In this embodiment, one pair of upper and lower electrodes generates the first key signal, and the other pair of upper and lower electrodes generates the second key signal, so that the contact between the pairs of electrodes is more accurate. This avoids the problem of poor contact between one upper electrode and multiple lower electrodes.

Thus, key signal generating circuit 201 is electrically connected to first upper electrode 710, second upper electrode 711, first lower electrode 706, and second lower electrode 707 of layered structure 701, respectively. In the second (gaming) mode, second upper electrode 711 is connected to second lower electrode 707 through elastic body 708 and a first key signal 712 is generated that is related to the pressure on elastic body 708, as described with reference to FIG. 3. When first lower electrode 706 is turned on in the first (normal) mode, when first upper electrode 710 and first lower electrode 706 are connected, a second key signal 713 is generated.

In further alternatives of this embodiment, the electrodes may not be of uniform thickness. The thickness of the first upper electrode may be greater than the thickness of the second upper electrode. Alternatively, the thickness of the first lower electrode may be greater than the thickness of the second lower electrode. In either case, this allows for the thickness of the elastic body which may prevent contact between the first upper and lower electrodes (i.e., the electrodes which are not connected by the elastic body).

FIG. 8

Figure 8:
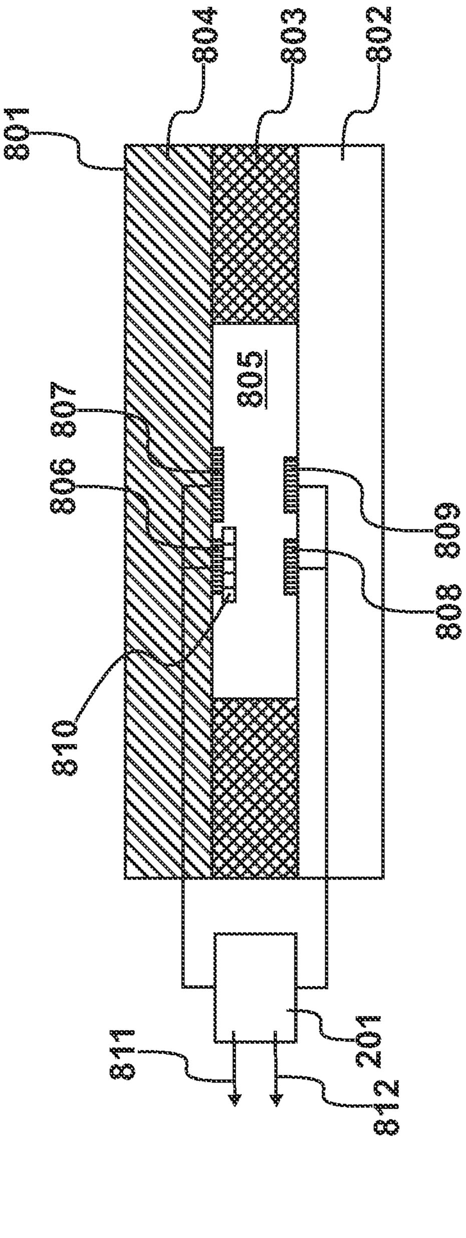
FIG. 8 is a diagram of a fifth embodiment in accordance with the invention.

A fifth embodiment is shown in FIG. 8. Similarly to layered structure 701, layered structure 801 has a base layer 802, support structure 803, and elastic film layer 804, defining a cavity 805. First upper electrode 806 and second upper electrode 807 are arranged on elastic film layer 804, first lower electrode 808 and second lower electrode 809 are arranged on base layer 802, and all four electrodes are connected to circuit 201. However, variable resistance elastic body 810 is arranged on the bottom surface 811 of first upper electrode 806, rather than being on a lower electrode.

In use, layered structure 801 works in the same way as layered structure 701. In the gaming mode, first upper electrode 806 is connected to first lower electrode 808 through elastic body 810 and a first key signal 811 is generated that is related to the pressure on elastic body 810. When second lower electrode 809 is turned on in the first (normal) mode, when second upper electrode 807 and second lower electrode 809 are connected, a second on/off key signal 812 is generated.

Again, in order to allow for the thickness of elastic body 810, the thickness of the second upper electrode may be greater than the thickness of the first upper electrode, or the thickness of the second lower electrode may be greater than the thickness of the first lower electrode.

Thus, it is clear that the elastic body may be arranged on any electrode.

FIG. 9

Figures 9A, 9B, 9C:
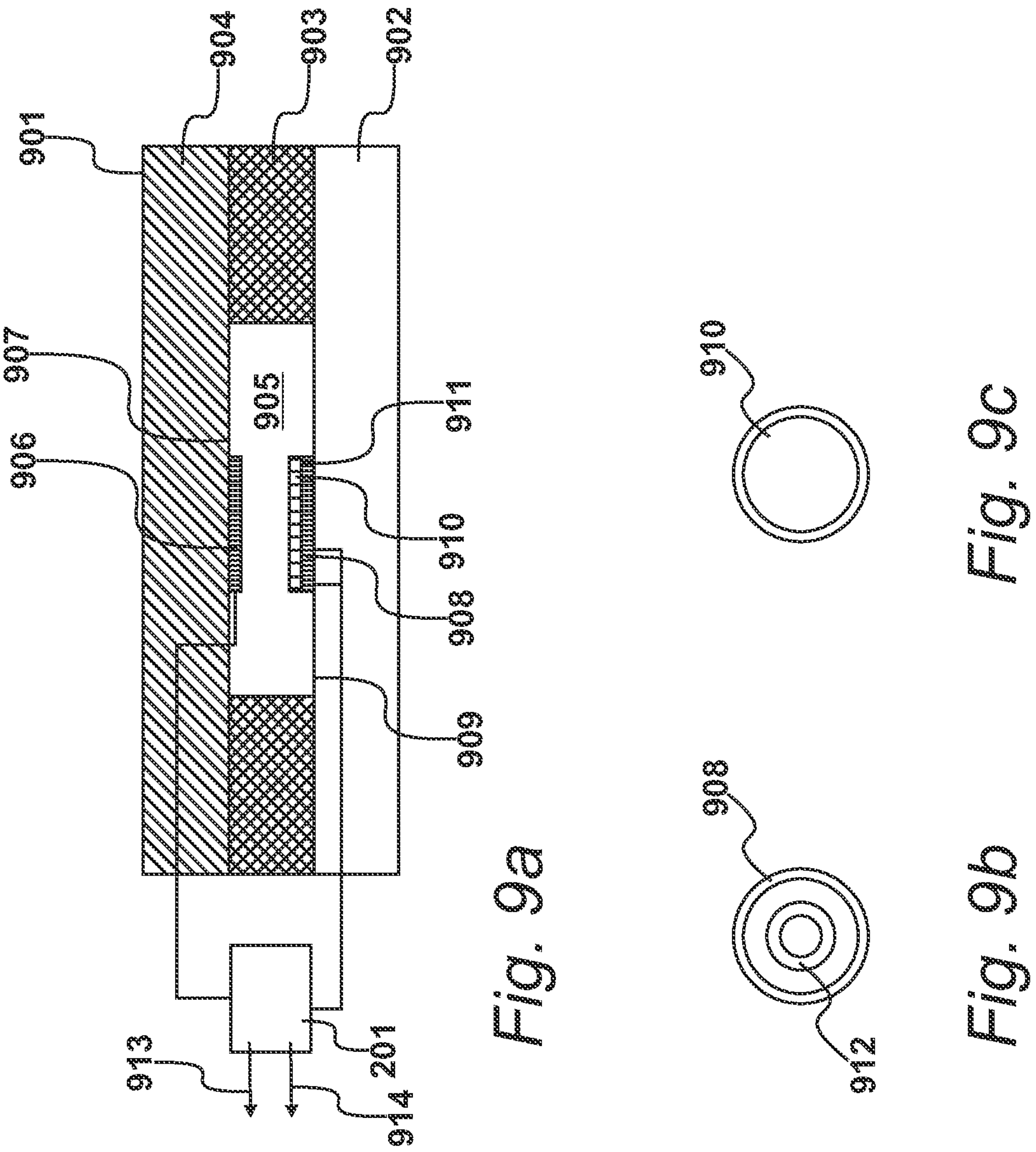
FIG. 9 is a diagram of a sixth embodiment in accordance with the invention.

A sixth embodiment is shown in FIG. 9*a*. Similarly to layered structure 301, layered structure 901 has a base layer 902, support structure 903, and elastic film layer 904, defining a cavity 905. Upper electrode 906 is arranged on the lower surface 907 of elastic film layer 904. Two lower electrodes, of which only second lower electrode 908 is visible, are arranged on the upper surface 909 of base layer 902, opposite to upper electrode 906. All three electrodes are connected to circuit 201. Variable resistance elastic body 910 is disposed on the upper surface 911 of second lower electrode 908.

The two lower electrodes 908 and 912 are shown in plan view in FIG. 9*b*, and elastic body 910 is shown in plan view in FIG. 9*c*. Second lower electrode 908 has a circular ring shape, and is arranged around first lower electrode 912. Elastic body 910 has the same shape as second lower electrode 908, and is disposed on top of it.

In use, layered structure 901 works in the same way as layered structure 601 to generate a first key signal 913 on connection of electrodes 906 and 908 via elastic body 910, and a second key signal 914 on connection of electrodes 906 and 912.

As an alternative, the elastic body could be disposed on top of first lower electrode 912, in which case it would be of a suitable size and shape to cover that electrode.

FIG. 10

Figure 10:
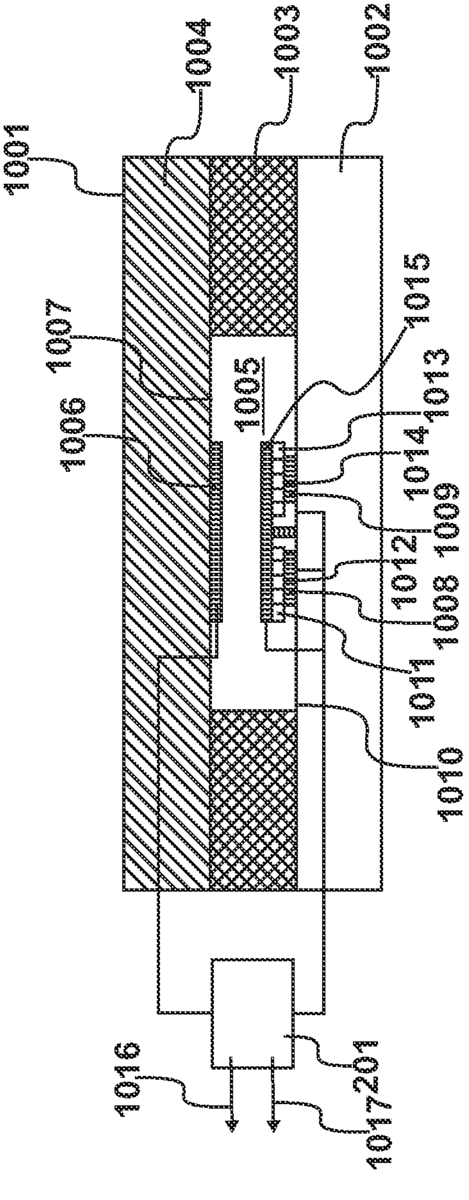
FIG. 10 is a diagram of a seventh embodiment in accordance with the invention.

A seventh embodiment is shown in FIG. 10. Similarly to layered structure 301, layered structure 1001 has a base layer 1002, support structure 1003, and elastic film layer 1004, defining a cavity 1005, and one upper electrode 1006 arranged on the lower surface 1007 of elastic film layer 1004. A first lower electrode 1008 and a second lower electrode 1009 are arranged on the upper surface 1010 of base layer 1002, opposite to upper electrode 1006.

A first variable resistance elastic body 1011 is disposed on the upper surface 1012 of first lower electrode 1008. A second variable resistance elastic body 1013 is disposed on the upper surface 1014 of second lower electrode 1008. A third lower electrode 1015 is disposed above both elastic bodies 1011 and 1013. All four electrodes are connected to circuit 201.

In this embodiment, upper electrode 1006 moves downward along with the deformation of elastic film layer 1004 during application, and then contacts third lower electrode 1015. This connection causes circuit 201 to generate a second key signal 1016, which is a simple on/off signal. Because the third lower electrode 1015 covers both elastic bodies 1011 and 1013, third lower electrode 1015 affects the variable resistance of first and second lower electrodes 1008 and 1009. Elastic bodies 1011 and 1013 are pressed, and change from insulators to conductive bodies, which in turn causes upper electrode 1006, first lower electrode 1008, and second lower electrode 1009 to conduct. This causes circuit 201 to generate a first key signal 1017 that is related to the pressure on elastic bodies 1011 and 1013, as described with reference to FIG. 3.

Thus, key signal generating circuit 201 is electrically connected to upper electrode 1006, third lower electrode 1015, and first and second lower electrodes 1008 and 1009 of layered structure 1006. In the preset first (normal) mode when upper electrode 1006 is connected to third lower electrode 1015, the second key signal 1016 is generated; in the preset second (gaming) mode contact is made from upper electrode 1006 via elastic bodies 1011 and 1013 to the corresponding first and second lower electrodes 1008 and 1009. When electrodes 1008 and 1009 are turned on, the first key signal 1017 is generated.

In alternatives to this embodiment, there may be more than two lower electrodes, each with a corresponding variable resistance elastic body, below the third electrode.

FIG. 11

Figure 11:
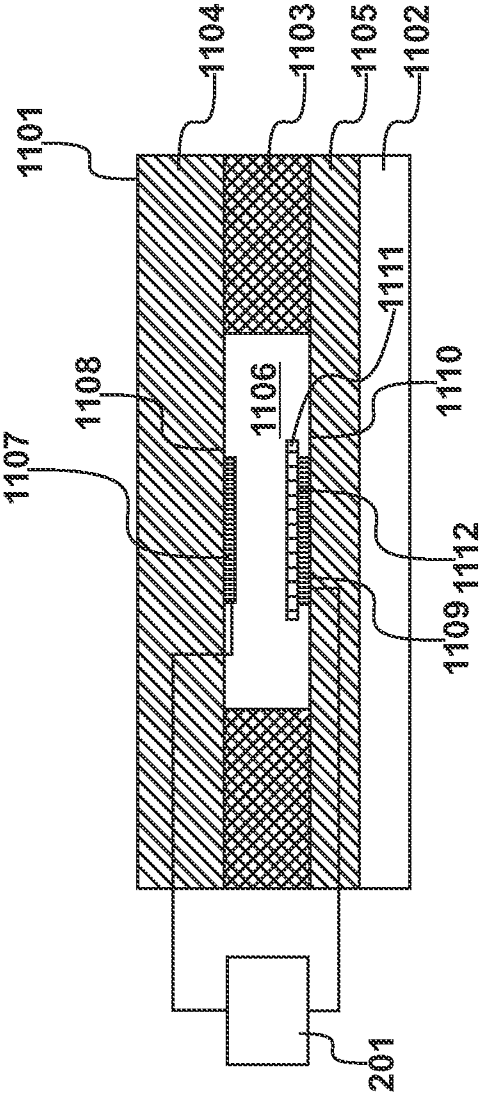
FIG. 11 is a diagram of an eighth embodiment beyond the scope of the invention.

An eighth embodiment is shown in FIG. 11. Similarly to layered structure 301, layered structure 1101 has a base layer 1102, support structure 1003, and first elastic film layer 1104. In addition, second elastic film layer 1105 is disposed on base layer 1102, below support structure 1103. Cavity 1106 is defined by first elastic film layer 1104 and support structure 1103 on second elastic film layer 1105. One upper electrode 1107 is arranged on the lower surface 1108 of first elastic film layer 114. A lower electrode 1109 is arranged on the upper surface 1110 of base layer 1102, opposite to upper electrode 1107. Variable resistance elastic body 1111 is arranged on the upper surface 1112 of lower electrode 1109. Both electrodes are connected to circuit 201.

Second elastic film layer 1105 is made from the same material as first elastic film layer 1104, or another suitable material. In this embodiment, base layer 1102 need not be made from an insulating material.

In use, this embodiment operates in the same way as the first embodiment.

In all the embodiments of the button structure described herein, an upper electrode is provided on the lower surface of an elastic film layer, and a lower electrode is provided on the upper surface of a base layer. A variable resistance elastic body is provided on one of the electrodes, between them. When flexing of the elastic film layer occurs, the upper electrode will move down with the elastic film layer, the elastic body will be pressed. The elastic body will change from an insulator to a conductive body when compressed. Thus, the upper electrode and the lower electrode are connected, and the resistance value is related to the pressure, or the deformation of the elastic body. Under the premise of realizing the two states of button opening and closing, different degrees of operation in the game can be reflected from the game keyboard buttons. The force change process realizes the continuous change and adjustment of the pressure of the game buttons, thereby improving the user's control of the degree of pressing during the game, and improving the game experience.

In the embodiments provided in this application, it should be understood that the disclosed device and method may be implemented in other ways.

The device embodiments described above are merely illustrative. For example, the division of the units is only a logical function division, and there may be other divisions in actual implementation. For example, multiple units or components may be combined or it can be integrated into another system, or some features can be ignored or not implemented.

In addition, the displayed or discussed mutual coupling or direct coupling or communication connection may be indirect coupling or communication connection through some communication interfaces, devices or units, and may be in electrical, mechanical or other forms.

In addition, the units described as separate components may or may not be physically separated, and the components displayed as units may or may not be physical units, that is, they may be located in one place, or they may be distributed on multiple network units.

Some or all of the units may be selected according to actual needs to achieve the objectives of the solutions of the embodiments.

The invention claimed is:

1. A button structure, comprising:
- a base layer;
- a support structure arranged on the base layer;
- an elastic film layer, the elastic film layer covering the support structure and connected to the support structure, the support structure and the elastic film layer defining a cavity above the base layer;
- a first upper electrode arranged on a lower surface of the elastic film layer and located in the cavity;
- a first lower electrode and a second lower electrode, both arranged on the base layer opposite said first upper electrode and located in the cavity, each said first lower electrode and said second lower electrode is connected to a key signal generation circuit; and
- a first variable resistance elastic body between the first upper electrode and the first lower electrode, either arranged on a lower surface of the first upper electrode or arranged on an upper surface of the first lower electrode;
- such that when the elastic film layer is elastically deformed in a direction of the base layer, the first variable resistance elastic body connects the first upper electrode with the first lower electrode so as to generate a first signal related to the elastic deformation of the first variable resistance elastic body, and the first upper electrode electrically contacts the second lower electrode to generate a second signal.

2. A button structure according to claim 1, wherein the second lower electrode is arranged around the first lower electrode.

3. A button structure according to claim 1, wherein:
- the first variable resistance elastic body is arranged on the first lower electrode,
- a second variable resistance elastic body is arranged on the second lower electrode, and
- a third electrode is arranged on a top surface of the first variable resistance elastic body and the second variable resistance elastic body, opposite the first upper electrode.

4. A button structure according to claim 1, further comprising a second elastic film layer disposed on said base layer, wherein said support structure is arranged on said second elastic film layer, and wherein said first lower electrode and said second lower electrode are arranged on said second elastic film layer.

5. An apparatus comprising at least one button structure according to claim 1, and a processor connected to the first upper electrode and the first lower electrode of the button structure, wherein the processor is configured to generate the first signal related to the elastic deformation of the first variable resistance elastic body when the first upper electrode is connected to the first lower electrode through the first variable resistance elastic body.

6. A button structure, comprising:

a base layer;

a support structure arranged on the base layer;

an elastic film layer, the elastic film layer covering the support structure and connected to the support structure, the support structure and the elastic film layer defining a cavity above the base layer;

a first upper electrode and a second upper electrode arranged on a lower surface of the elastic film layer and located in the cavity;

a first lower electrode and a second lower electrode, both arranged on the base layer and located in the cavity, said first lower electrode opposite said first upper electrode and said second lower electrode opposite said second upper electrode, each said first lower electrode and said second lower electrode is connected to a key signal generation circuit; and a first variable resistance elastic body between the first upper electrode and the first lower electrode, either arranged on a lower surface of the first upper electrode only or arranged on an upper surface of the first lower electrode only;

such that when the elastic film layer is elastically deformed in a direction of the base layer, the first variable resistance elastic body connects the first upper electrode with the first lower electrode so as to generate a first signal related to the elastic deformation of the first variable resistance elastic body, and the second upper electrode directly electrically contacts the second lower electrode to generate a second signal.

7. A button structure according to claim 6, wherein:

the first variable resistance elastic body is arranged on the first upper electrode, and either a thickness of the second upper electrode is greater than that of the first upper electrode or a thickness of the second lower electrode is greater than that of the first lower electrode.

8. A button structure according to claim 1, further comprising a pressing mechanism comprising a pressing portion arranged above the elastic film layer and above the cavity, wherein the pressing portion is configured to be depressed by manual action, such that the pressing portion engages with the elastic film layer to move the elastic film layer towards the base layer.

9. A button structure according to claim 8, wherein:

the pressing portion is an elastic pressing portion with an elastic abutting portion provided on a lower surface of the elastic pressing portion to engage with the elastic film layer;

the pressing mechanism further comprises at least one elastic support portion; and an upper end of the elastic support portion is connected to the lower surface of the elastic pressing portion, and a lower end of the elastic support portion is arranged on the elastic film layer.

10. A method of generating a first signal and a second signal, comprising the steps of:

obtaining a button structure comprising a base layer having a first lower electrode and a second lower electrode on an upper surface of the base layer, an elastic film layer having an upper electrode on a lower surface of the elastic film layer, and a variable resistance elastic body disposed on one of the first lower electrode, the second lower electrode, or the upper electrode, wherein each said first lower electrode and said second lower electrode is connected to a key signal generation circuit;

applying a force to the elastic film layer to move the upper electrode towards the first lower electrode and the second lower electrode;

compressing the variable resistance elastic body in response to the force;

contacting the upper electrode and the first lower electrode to generate the first signal in response to elastic deformation of the variable resistance elastic body; and contacting the upper electrode and the second lower electrode to generate the second signal.

* * * * *